(12) United States Patent
Jansen et al.

(10) Patent No.: US 10,239,374 B2
(45) Date of Patent: Mar. 26, 2019

(54) AXLE UNIT

(71) Applicant: SAF-HOLLAND GmbH, Bessenbach (DE)

(72) Inventors: Roger Jansen, Holton, MI (US); Gregory Galazin, Muskegon, MI (US)

(73) Assignee: SAF-HOLLAND GmbH, Bessenbach (DE)

( * ) Notice: Subject to any disclaimer, the term of this patent is extended or adjusted under 35 U.S.C. 154(b) by 43 days.

(21) Appl. No.: 15/510,094

(22) PCT Filed: Sep. 7, 2015

(86) PCT No.: PCT/EP2015/070340
§ 371 (c)(1),
(2) Date: Mar. 9, 2017

(87) PCT Pub. No.: WO2016/037962
PCT Pub. Date: Mar. 17, 2016

(65) Prior Publication Data
US 2017/0253098 A1    Sep. 7, 2017

(30) Foreign Application Priority Data
Sep. 12, 2014   (DE) .......................... 10 2014 218 323

(51) Int. Cl.
*B60G 7/00* (2006.01)
*B60G 9/00* (2006.01)
(Continued)

(52) U.S. Cl.
CPC ............ *B60G 7/001* (2013.01); *B60B 35/007* (2013.01); *B60B 35/08* (2013.01); *B60G 7/008* (2013.01);
(Continued)

(58) Field of Classification Search
CPC .... B60G 7/001; B60G 7/008; B60G 2200/31; B60G 9/003; B60G 2204/148;
(Continued)

(56) References Cited

U.S. PATENT DOCUMENTS 5,690,353 A    11/1997  Vandenberg
7,048,288 B2 *  5/2006  Chan ...................... B60G 7/001
                                                280/124.11
(Continued)

FOREIGN PATENT DOCUMENTS

CN    103476609 B    12/2015
DE    19818698        6/1999
(Continued)

OTHER PUBLICATIONS

European Patent Office; International Search Report, dated Oct. 29, 2015.

*Primary Examiner* — Laura Freedman
(74) *Attorney, Agent, or Firm* — Price Heneveld LLP (57) ABSTRACT

An axle unit comprising a first suspension arm element and a second suspension arm element, wherein the first suspension arm element and the second suspension arm element can be mounted on a vehicle frame so as to be pivotable about a common pivot axis, wherein the first suspension arm element has a first joining region configured as a recess, and the second suspension arm element has a second joining region configured as a recess, wherein the first joining region and the second joining region are arranged on two opposing sides of an axle tube extending substantially along a tube axis, and wherein the axle tube can be secured by substance bonding in the first and second joining regions to the first and second suspension arm elements.

26 Claims, 3 Drawing Sheets

(51) Int. Cl.
 B60B 35/00 (2006.01)
 B60B 35/08 (2006.01)
(52) U.S. Cl.
 CPC .......... B60G 9/003 (2013.01); *B60G 2200/22* (2013.01); *B60G 2200/31* (2013.01); *B60G 2204/148* (2013.01); *B60G 2206/012* (2013.01); *B60G 2206/11* (2013.01); *B60G 2206/12* (2013.01); *B60G 2206/8201* (2013.01); *B60G 2300/026* (2013.01)
(58) Field of Classification Search
 CPC .......... B60G 2206/012; B60G 2206/11; B60G 2206/8201; B60G 2200/22; B60G 2300/026; B60G 2206/12; B60B 35/007; B60B 35/008; B60B 35/08
 See application file for complete search history.

(56) References Cited

U.S. PATENT DOCUMENTS

| | | | |
|---|---|---|---|
| 7,086,655 B2 * | 8/2006 | Chan | B60G 7/001 280/124.116 |
| 7,360,774 B2 * | 4/2008 | Saieg | B60G 7/001 280/124.116 |
| 7,726,673 B2 * | 6/2010 | Saieg | B60G 7/001 280/124.116 |
| 7,954,833 B1 * | 6/2011 | Heath | B60G 9/003 280/124.116 |
| 8,317,209 B2 * | 11/2012 | Aalderink | B60G 9/003 280/124.116 |
| 9,333,826 B1 * | 5/2016 | Saieg | B60G 9/003 |
| 9,463,667 B2 * | 10/2016 | Spielmann | B60G 7/001 |
| 2006/0237940 A1 | 10/2006 | Raidel, II et al. | |
| 2013/0228993 A1 | 9/2013 | Michel et al. | |
| 2017/0259635 A1 * | 9/2017 | Jansen | B60G 7/001 |

FOREIGN PATENT DOCUMENTS

| | | |
|---|---|---|
| DE | 102005038274 | 2/2007 |
| DE | 202009001029 | 12/2009 |
| DE | 19781757 | 3/2011 |
| DE | 102012021433 | 4/2014 |

\* cited by examiner

AXLE UNIT

BACKGROUND OF THE INVENTION

The present invention concerns an axle unit, in particular for use in trucks.

Axle units are known from the prior art insofar as an axle tube, which is often a rigid axle, is mounted on or secured to the frame of the truck so as to be sprung or damped via a suspension arm arrangement, wherein one or a plurality of vehicle wheels is mounted rotatably on the axle tube. The connecting region between the axle tube and the longitudinal suspension arm here is a portion of the truck's chassis suspension which is particularly heavily loaded, and in particular subject to periodic load changes. It has proved problematic in particular to absorb the torsional moments occurring on the axle tube in the connections to the longitudinal suspension arm such that the weld seams produced there are not damaged. In the past, many attempts have been made to adapt the connecting region between the longitudinal suspension arm and the axle tube to these high loads. Many axle units are known from the prior art which have had to be over-dimensioned and hence have a very high weight of the axle unit, as a consequence of the design with greater safety against fatigue breakage or similar damage to the connecting region between the axle unit and suspension arm unit. There is therefore a need for improvement in the area of the connection between the longitudinal suspension arm and the axle tube of a truck wheel suspension, in order in particular to reduce the weight of the axle unit and at the same time achieve sufficient strength values and allow simple production.

The object of the present invention is to provide an axle unit which can be produced easily while having particularly height strength values of the connecting region between an axle tube and a suspension arm element, in particular to resist the torsional moments acting in the axle tube, while having a low component weight.

SUMMARY OF INVENTION

According to the invention, the axle unit comprises a first suspension arm element and a second suspension arm element, wherein the first suspension arm element and the second suspension arm element can be mounted on a vehicle frame so as to be pivotable about a common pivot axis, wherein the first suspension arm element has a first joining region configured as a recess, and the second suspension arm element has a second joining region configured as a recess, wherein the first joining region and the second joining region are arranged relative to each other such that they can be arranged, preferably are arranged, on two opposing sides of an axle tube extending substantially along a tube axis, and wherein the axle tube can be secured, and preferably is secured, by substance bonding in the first and second joining regions to the first and second suspension arm elements. The first and second suspension arm elements together advantageously form a longitudinal suspension arm of a truck. Both suspension arm elements are mounted on the vehicle frame of a truck so as to be pivotable about a pivot axis. In particular, preferably here a bearing eye is provided in which at least one of the suspension arm elements, preferably both the suspension arm elements, is or are pivotably secured, and which is established on the bearing block of a truck. The respective other suspension arm element is preferably also secured in the bearing eye. Alternatively, preferably the other suspension arm element is secured on the first suspension arm element. At their ends opposite the pivot axis, the suspension arm elements each have a joining region which is configured for securing the respective suspension arm element to an axle tube by substance bonding. The joining regions each comprise a recess in a portion of the respective suspension arm element which is advantageously configured rounded or curved. Particularly preferably, the respective suspension arm element in the area of its joining region has a contact face which has substantially the same curvature as the outer face of the axle tube in the region of the fixing to the suspension arm elements. In other words, in this way, advantageously, if the axle tube is formed as a hollow cylinder and has a cylindrical outer face, the respective contact face of the first and second suspension arm elements in the area of the joining region is also a portion of a cylinder casing surface. In an alternative, preferred embodiment in which the axle tube preferably has a rounded, rectangular cross-section, the respective contact face of the first and second suspension arm elements is also advantageously formed rectangular and rounded. The first and second joining regions are arranged substantially opposite each other relative to a tube axis, wherein between the joining regions, advantageously a space is defined in which the axle tube may be arranged. Particularly preferably, the first joining region is arranged in the area of the "eleven o'clock" to "one o'clock" position, and the second joining region is arranged in the area of the "five o'clock" to "seven o'clock position", of a circle running about the tube axis. Advantageously therefore, in the usage position, the first suspension arm element may be secured or preferably is secured on the top of the axle tube, and the second suspension arm element may be secured or preferably is secured on the underside of the axle tube. The substance bonding connection between the first suspension arm element and the axle tube, and between the second suspension arm element and the axle tube, is particularly preferably a weld connection. Alternatively or in addition to the weld connection, also a substance bonding connection could be produced by soldering or by gluing. The first and second joining regions are preferably formed as recesses on the first and second suspension arm elements respectively, such that the axle tube is visible or accessible from outside the axle unit through the joining region. Further preferably, the inner edge or inner face of the respective region is arranged adjacent to the axle tube, such that a weld connection between the respective suspension arm element and the axle tube can be produced along this inner edge or inner face.

In a preferred embodiment, the first suspension arm element and the second suspension arm element are configured as separate components. In other words therefore, before assembly of the axle unit, the first and second suspension arm elements are not connected together directly or indirectly by substance bonding, wherein the first and second suspension arm elements are connected together indirectly only after production of a weld connection to the axle tube, or directly by production of a weld connection in the region of an overlap. The advantage of the separate configuration of the first and second suspension arm elements is that both elements can first be arranged on a pivot bearing so as to be pivotable about the pivot axis, and then the axle tube can be brought into the desired position relative to the first and second suspension arm elements, and the suspension arm elements can then be pivoted into a position in which the weld connection may be produced between the first suspension arm element and the axle tube, and between the second suspension arm element and the axle tube. Alternatively, preferably, first a weld connection may be produced in the region of an overlap of the first and second suspension arm elements, wherein then the first and second suspension arm elements may be fixed to the axle tube in the first and second joining regions. The number of components to be handled simultaneously is therefore relatively low, and production and assembly of the axle unit are advantageously simplified.

Preferably, the first joining region and the second joining region surround the axle tube at least in regions. Particularly preferably, the first joining region has a curvature around the tube axis. Further preferably, the second joining region also has a curvature around the tube axis. It is preferred if the joining regions do not surround the axle tube completely, but only to an extent of 0.3 to 0.7 times, particularly preferably 0.4 to 0.6 times the circumference of the axle tube. Since the joining regions surround the axle tube in regions, it is possible, in a particularly simple manner, to produce a weld connection in the first joining region and in the second joining region after arranging the suspension arm elements relative to the axle tube.

Particularly preferably, the first joining region and the second joining region are arranged offset to each other relative to the tube axis. In other words therefore, there is a distance between the joining regions measured parallel to the axle tube or tube axis. This distance is preferably measured in the middle of the respective extension of the joining region parallel to the axle tube. Preferably, in other words, the first joining region is arranged on the axle tube further towards the inside or further towards the outside than the second joining region. The offset arrangement of the first and second joining regions allows an improved transfer of torsional moments between the axle tube and the first and second suspension arm elements. In particular, preferably, the first joining region can absorb a higher torsional moment than the second joining region, wherein the first joining region is preferably adapted to receive a higher torsional moment than the second joining region. By this preferred distribution of absorption of torsional moments of different size over the two joining regions, it is possible to significantly extend the service life of the axle unit, since in total a higher torsional moment can be transferred between the axle tube and the first and second suspension arm elements.

Particularly preferably, the first joining region is arranged closer to the middle of the axle tube than the second joining region. The middle of the axle tube is preferably the region of the axle tube lying in the respective middle of the vehicle. In other words, the middle of the axle tube is the portion or direction along the axle tube which is advantageously arranged facing away from the bearing journals arranged at the distal ends of the axle tube. Particularly preferably, the axial center lies half way along the entire extension of the axle tube along the tube axis. With the preferred arrangement of the first joining region closer to the middle of the axle tube, the first joining region preferably absorbs higher torsional moments than the second joining region. A torsion of the axle tube occurs preferably when a greater suspension compression occurs at a first longitudinal suspension arm connected to the axle tube (preferably consisting of a first suspension arm element and the second suspension arm element) than at a second longitudinal suspension arm. This situation occurs in particular when the truck is cornering.

In a particularly preferred embodiment, the first joining region has a first axial extension parallel to the tube axis, wherein the second joining region has a second axial extension parallel to the tube axis, wherein a first joint center is defined centrally to the first axial extension and perpendicular to the tube axis, and a second joint center is defined centrally to the second axial extension and perpendicular to the tube axis, wherein the first joint center is spaced from the second joint center by an offset. The first or second axial extension is advantageously defined as the maximum extension of the respective first or second joining region parallel to the tube axis. A respective joint center is defined centrally to this axial extension of the first or second joining region, which center thus serves as a reference geometry for determining the offset between the first joining region and the second joining region. The offset between the first joining region and the second joining region is thus not determined from the external geometry of the respective joining region, but in each case relates to the joint center of the respective joining region. Since, on transmission of a force or moment, the respective reference geometry lies in the middle of the force-transmitting material regions concerned, in this way it is possible to adapt the offset between the joining regions optimally to the forces and moments acting on the axle tube and the suspension arm elements respectively.

Preferably, the offset is 0.05 to 0.4 times, preferably 0.07 to 0.2 times, and particularly preferably approximately 0.07 to 0.1 times the outer diameter of the axle tube in the region of the first and second suspension arm elements. For the case that the axle tube has no cylindrical or hollow cylindrical cross-section in the region of the first and second suspension arm elements, the diameter of the axle tube is taken preferably as the diameter of a circle drawn through the central extension of the axle tube transversely to the tube axis. Observation of the preferred ratio range from 0.05 to 0.4 in particular allows the use of the present invention in various axle systems with different sizes of the suspension arm elements and axle tube. The particularly preferred range from 0.07 to 0.2 offers particular advantages for axle systems which may be used both in truck trailers and in truck tractor vehicles. The particularly preferred range from 0.07 to 0.1 guarantees the best compromise of a particularly high transferable torsional moment and at the same time a weight reduction of the axle unit by avoiding over-dimensioning of the connecting region between the suspension arm elements and the axle tube.

Particularly preferably, the first axial extension is equal to the second axial extension. In other words, therefore, the first joining region and the second joining region have the same extension parallel to the tube axis. The advantage of this embodiment is that advantageously, the same tool may be used to produce the first joining region and the second joining region, and hence the production costs for manufacture of the axle unit can be significantly reduced.

Preferably, the first joining region and/or the second joining region has a peripheral face with a central length which stands in a ratio of 0.4-1.3, preferably 0.6-1, and particularly preferably approximately 0.85-0.95 to the circumference of the axle tube in the region of the first and/or the second joining region. The peripheral face here is defined preferably as the inwardly directed face or preferably rounded edge of the first and/or second joining region configured as a recess, which serves for production of a weld connection of the first or second suspension arm element to the axle tube. Particularly preferably, the peripheral face is configured annular and curved, wherein the curvature runs transversely to the annular track. Variation of the central length of the peripheral face of the first and/or second joining region is a possibility for influencing the actual connecting length, i.e. in other words, the length along which a weld seam is produced between the axle tube and the respective suspension arm element. The central length in this context is defined as the extension of the peripheral face measured in the middle between the axle tube and the suspension arm element. It has been shown that in the context of a ratio from 0.4 to 1.3, a favorable compromise can be achieved between a remaining residual wall thickness of the suspension arm unit outside the first and/or second joining region, and on the other hand a sufficiently large weld seam length between the suspension arm element and axle tube. The preferred ratio from 0.6 to 1 here allows, with a preferred slightly elliptical configuration of the weld portion, a central length of the peripheral face to be achieved which is substantially greater than or equal to the circumference of the axle tube, whereby in the design of the axle unit, preferably merely a scaling need be performed and always the correspondingly advantageous ratio is selected between the edge length of the first and/or second joining region and the circumference of the axle tube.

Particularly preferably, the axle tube has a pressure half and a tension half, wherein the first joining region is provided exclusively in the pressure half and wherein the second joining region is provided exclusively in the tension half of the axle tube. The pressure half of the axle tube is preferably the region of the axle tube which is mainly loaded with compression stress under a bending load in the region of the axle unit. In particular, it is preferred if the pressure half of the axle tube is arranged in the half of the axle tube which is situated substantially on its top side in relation to the spatial arrangement of the axle tube in its state fitted on the axle unit. The tension half of the axle tube is preferably the half of the axle tube opposite the pressure half. In the tension half, the axle tube is preferably mainly loaded with tensile stress. In the context of the present invention, it has proved advantageous to arrange the first joining region in the pressure half of the axle tube. The first joining region preferably transmits a greater torsional moment than the second joining region, and therefore on bending of the axle tube, is loaded advantageously only with a compressive stress in addition to the torsion. In this way, the service life of the connection between the suspension arm element and the axle tube can be significantly increased, since the axle unit in the first joining region is loaded exclusively with torsion and compression stress. The second joining region advantageously transmits a smaller proportion of the torsion stress of the axle tube than the first joining region, and may therefore absorb higher tensile stresses on bending of the axle tube and transmit these to the second suspension arm element. The forces deforming the axle tube, which lead to the pressure at the tension half on the axle tube, are preferably the support force of the truck wheels acting on the outside or the distal end of the axle tube, and the weight force of the truck transmitted through the suspension arm element to the axle tube. Preferably, the pressure half of the axle tube is arranged on the side of the axle tube directed against gravity.

Advantageously, the first suspension arm element and the second suspension arm element form an overlap at their ends opposite the pivot axis. The overlap is advantageously an undercut, acting perpendicular to the tube axis, of a portion of the first suspension arm element together with a portion of the second suspension arm element. Advantageously, the first suspension arm element and the second suspension arm element are each configured stepped in the region of the overlap. The overlap advantageously forms a region in which a weld seam may be produced between the first and second suspension arm elements, wherein the overlap or undercut protects the axle body from contact with molten weld material. In this way, a deterioration of the material of the axle body outside the first joining region and the second jointing region by the deposit of melted material can be prevented. Furthermore, the overlap allows a better compensation for production tolerances in the outer diameter of the axle tube, since the suspension arm elements can be pushed together accordingly to a greater or lesser extent and overlap to a greater or lesser extent.

Further preferably, the first suspension arm element and the second suspension arm element form two overlaps, wherein the overlaps lie substantially opposite each other relative to the tube axis. The advantage of a second overlap between the first and second suspension arm element is that a second weld zone between the first and second suspension arm elements further increases the strength of the axle unit in comparison with the design described above with just a single overlap. Here again, in the region of the second overlap, a penetration of the weld seam into the material of the axle tube is prevented. The overlaps lie substantially opposite each other relative to the tube axis, wherein substantially means in particular an angular deviation of 1° to 10° from a plane or a straight line running through the tube axis. In this way, the position of the overlaps can be optimized in particular for good accessibility for production of a weld connection between the first and second suspension arm elements.

Particularly preferably, a carrier element may be secured by form fit and preferably by force fit to the first suspension arm element and/or the second suspension arm element. The carrier element is preferably the receiving region for an air spring. Advantageously, the carrier element has a supporting face on which an air spring can rest, wherein the air spring is supported on the frame of the truck with its end facing away from the supporting face. Advantageously, the first and/or the second suspension arm element have corresponding engagement means for a form fit, in particular preferably releasable, connection of the carrier element to the first suspension arm element and/or the second suspension arm element. Such engagement means may for example be recesses or bores and protrusions which can be brought into form-fit engagement with corresponding engagement means of the carrier element, in order to secure the carrier element to the assembly of the first and second suspension arm elements.

BRIEF DESCRIPTION OF THE DRAWINGS

Further advantages and features of the present invention arise from the description below of selected embodiments with reference to the attached drawings. In the drawings.

DETAILED DESCRIPTION OF THE PREFERRED EMBODIMENTS

Figure 1:
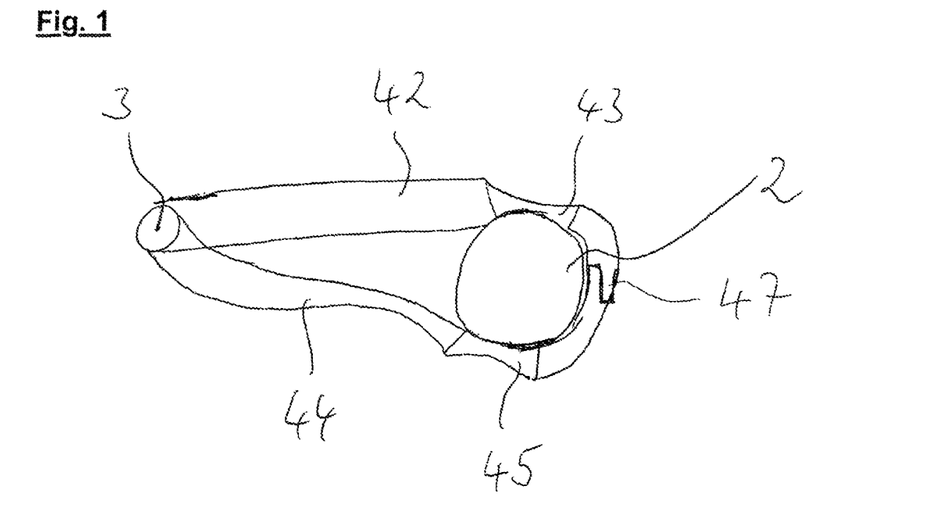
FIG. 1 is a side view of a preferred embodiment of the axle unit according to the invention.

The axle unit shown in FIG. 1 has a first suspension arm element 42 and a second suspension arm element 44. The first suspension arm element 42 and the second suspension arm element 44 can be secured or are secured to the frame of a truck, preferably via a bearing block, so as to be pivotable about a pivot axis 3. At its end opposite the pivot axis 3, the first suspension arm element 42 has a first joining region 43. At its end opposite the pivot axis 3, the second suspension arm element 44 has a second joining region 45. The second joining region 45 and the first joining region 43 surround, at least in regions, an axle tube 2 arranged between the first suspension arm element 42 and the second suspension arm element 44. The first joining region 43 and the second joining region 45 are preferably configured as recesses on the respective suspension arm elements 42, 44. Advantageously, the first suspension arm element 42 and the second suspension arm element 44 form an overlap 47 at their ends opposite the pivot axis 3. In the region of the overlap 47, the first suspension arm element 42 and the second suspension arm element 44 are preferably welded together.

Figure 2:
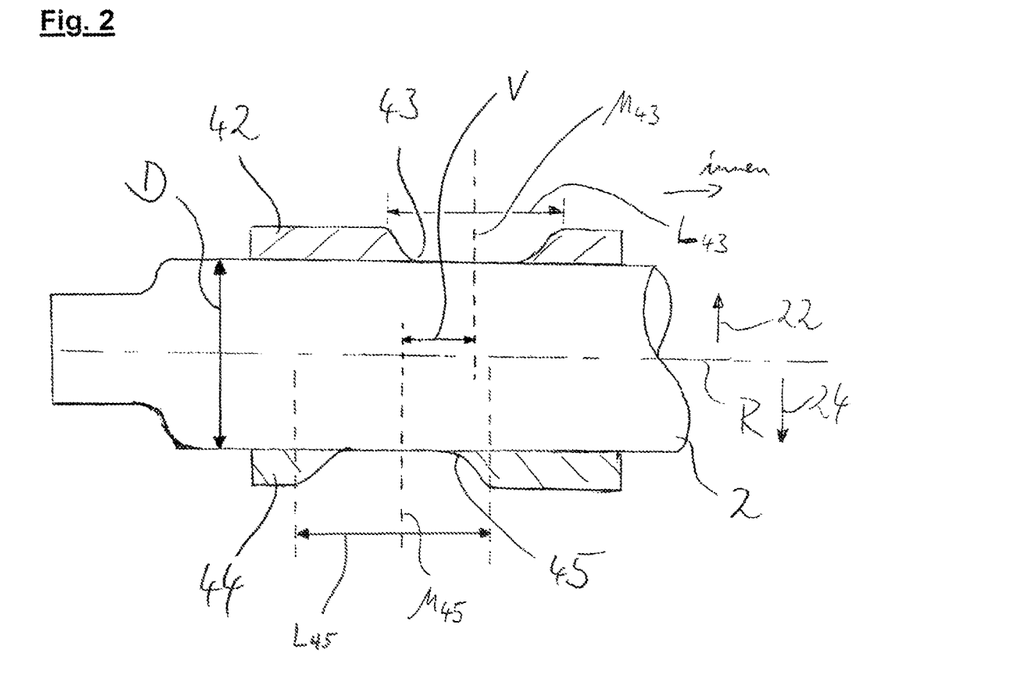
FIG. 2 is a partially cut-away view of the preferred embodiment shown in FIG. 1.

FIG. 2 shows a partially cut-away view of the preferred embodiment of the axle unit according to the invention, shown in FIG. 1. The uncut axle tube 2 in this view advantageously has a pressure half 22 and a tension half 24. Furthermore, preferably, the first suspension arm element 42 is arranged with its first joining region 43 preferably on the pressure half 22 of the axle tube 2. Particularly preferably, the first joining region 43 is welded to the axle tube 2 exclusively in the pressure half 22. The second joining region 45 of the second suspension arm element 44 is advantageously welded to the axle tube 2 in the tension half 24 thereof. Furthermore, the first joining region 43 has a first axial extension $L_{43}$ and a first joint center $M_{43}$ centrally to this first axial extension $L_{43}$. Furthermore, the second joining region 45 has a second axial extension $L_{45}$ and a second joint center $M_{45}$ centrally to this second axial extension $L_{45}$. Particularly preferably, the first joining region 43 and the second joining region 45 are arranged offset to each other by an offset V which is preferably measured parallel to the tube axis R. The offset V is here measured in particular between the first joint center $M_{43}$ and the second joint center $M_{45}$. Preferably, the offset V stands in a ratio of 0.8 to the outer diameter D of the axle tube 2 in the region of the first joining region and the second joining region. Furthermore, preferably, the first joining region 43 is arranged closer to the axial center of the axle tube 2 than the second joining region 45. At the same time, preferably the outer edges of the first suspension arm element 42 and the second suspension arm element 44 are arranged at the same height relative to the tube axis R. Advantageously, therefore, the first joining region 43 is not arranged centrally on the first suspension arm element 42. Furthermore, preferably, the second joining region 45 is not arranged centrally on the second suspension arm element 44.

Figure 3:
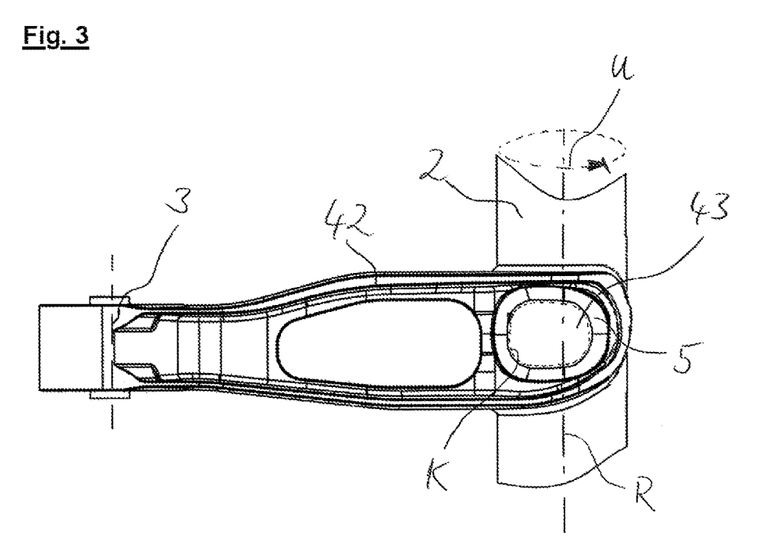
FIG. 3 is a top view of a preferred embodiment of the first suspension arm element.

FIG. 3 shows a top view of a preferred embodiment of the first suspension arm element 42. In particular, the form of the first joining region 43 can be seen, which is configured preferably as a recess on the first suspension arm element 42, and on its inside has a peripheral face 5. The peripheral face 5 preferably has a central length K which stands in a ratio of preferably 0.85-0.95 to the circumference U of the axle tube 2 in the area of the first joining region 43.

Figure 4:
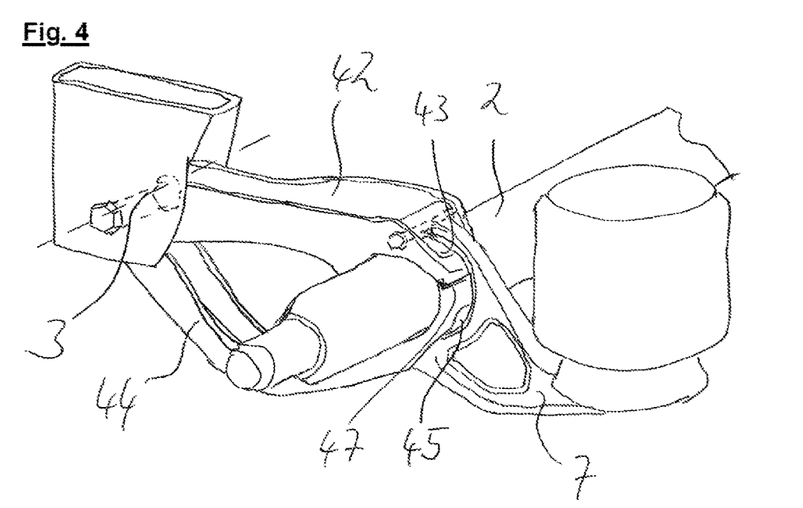
FIG. 4 is a perspective view of a preferred embodiment of the axle unit according to the invention.

FIG. 4 shows a perspective view of a preferred embodiment of the axle unit according to the invention. In particular, a pivot bearing is provided which is secured to a bearing block of the truck frame and mounts the first and second suspension arm elements 42, 44 so as to be pivotable about a pivot axis 3. The first suspension arm element 42 and the second suspension arm element 44 are thus preferably secured to the frame of the truck so as to be pivotable about same pivot axis. The first joining region 43 and the second joining region 45 are partially covered by a carrier element 7. The carrier element 7 serves in particular to mount an air spring and is preferably attached by form fit to the first suspension arm element 42 and/or to the second suspension arm element 44. To create the form-fit connection between the carrier element 7 and the first suspension arm element 42 and/or the second suspension arm element 44, particularly preferably a connection by means of bolts or screws is provided. The advantage of this embodiment is that the carrier element 7 can easily be detached from the axle unit. Preferably, the first suspension arm element 42 and the second suspension arm element 44 form an overlap 47. The overlap protects the axle tube 2 against contact with molten weld material when a weld connection is produced between the first suspension arm element 42 and the second suspension arm element 44. Thus a material weakness of the axle tube 2 outside the first joining region 43 and the second joining region 45 can be avoided. In this way, the service life of the axle unit and the maximum forces and moments which can be transmitted through the axle tube 2 can be increased significantly.

Figure 5:
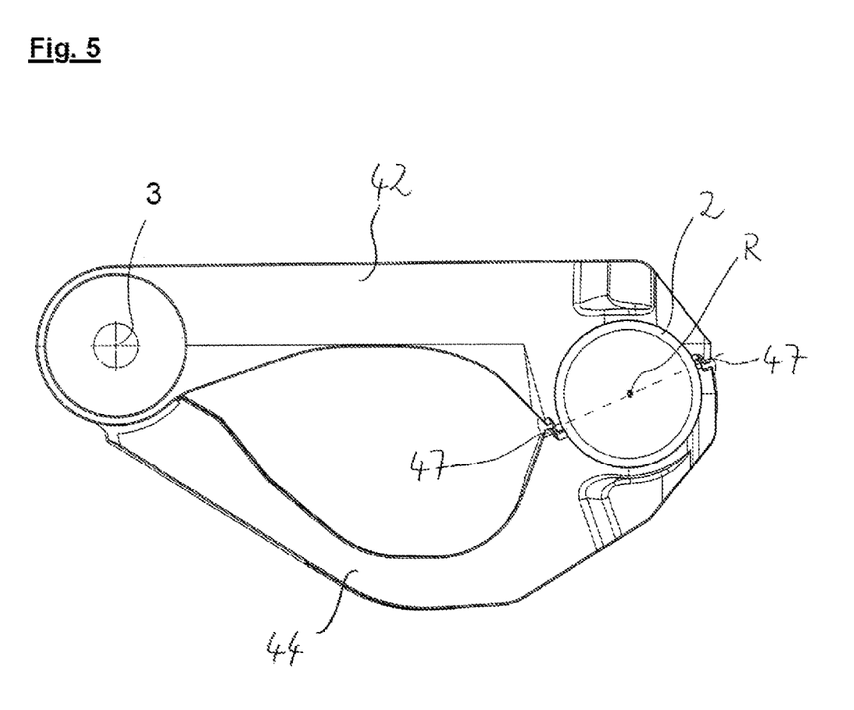
FIG. 5 is a side view of a preferred embodiment of the axle unit according to the invention.

The preferred embodiment of the axle unit shown in FIG. 5 differs from the embodiment shown in FIG. 1 in particular by a second overlap 47 which lies substantially opposite the overlap 47 facing away from the pivot axis 3 (shown on the right in the figure) in relation to the tube axis R. Particularly preferably, the overlaps 47 are intersected by a plane running through the tube axis (shown as a dotted line). The advantages of the second overlap 47 correspond to the advantages provided by the single overlap described above. The space formed between the first suspension arm element 42 and the second suspension arm element 44, on the left of the overlap 47 pointing towards the pivot axis 3, may particularly preferably be used for arrangement of further systems of the axle unit, such as brake cylinders or lines, wherein these are protected from eddying foreign bodies by the first and/or the second suspension arm element. In the embodiment shown in FIG. 5, in the region of the overlap 47 shown on the right, the first suspension arm element 42 overlaps the second suspension arm element 44 on the side facing away from the axle tube 2, whereas in the region of the overlap 47 shown on the left, the second suspension arm element 44 overlaps the first suspension arm element 42 on the side facing away from the axle tube 2. The suspension arm elements 42, 44 may therefore be pushed against each other in one direction along the plane shown in dotted lines, wherein the axle tube 2 itself positions the suspension arm elements 42, 44 relative to each other in this direction and achieves a secure contact of the suspension arm elements 42, 44 on the axle tube 2. The direction in which the suspension arm elements 42, 44 can be moved relative to each other, in order then to be positioned relative to each other by insertion of the axle tube, may be reversed if, alternatively and preferably, the first suspension arm element 42 overlaps the second suspension arm element 44 on the side facing towards the pivot axis 3, while the second suspension arm element 44 overlaps the first suspension arm element 42 on the side facing away from the pivot axis 3.

In the context of the present invention, as an alternative to the embodiment shown in FIG. 5, it is preferred if the first suspension arm element 42 overlaps the second suspension arm element 44 on both sides of the axle tube 2 in the region of two overlaps 47. In this way, the positioning of the suspension arm elements 42, 44 relative to each other can be improved, and the weld connection between the suspension arm elements 42, 44 and the axle tube 2 is easier to produce. In this embodiment, the first suspension arm element 42 carries the greater proportion of the force and moment transmission from and to the axle tube 2. As an alternative to the bilateral overlap by the first suspension arm element 42, the second suspension arm element 44 may overlap the first suspension arm element 42 on both sides in order to transmit the greater proportion of forces and bending moments from the axle tube 2 via the second suspension arm element 44.

LIST OF REFERENCE NUMERALS

2 Axle tube
3 Pivot axis
5 Peripheral face
7 Carrier element
22 Pressure half
24 Tension half
42 First suspension arm element
43 First joining region
44 Second suspension arm element
45 Second joining region
47 Overlap
D Outer diameter
K Central length
$L_{43}$ First axial extension
$L_{45}$ Second axial extension
$M_{43}$ First joint center
$M_{45}$ Second joint center
R Tube axis
U Circumference
V Offset

The invention claimed is:
1. An axle unit, comprising:
a first suspension arm element; and
a second suspension arm element;
wherein the first suspension arm element and the second suspension arm element are configured to be mounted on a vehicle frame so as to be pivotable about a common pivot axis;
wherein the first suspension arm element has a first joining region configured as a recess, and the second suspension arm element has a second joining region configured as a recess;
wherein the first joining region and the second joining region are arranged on two opposing sides of an axle tube extending substantially along a tube axis;
wherein the axle tube is secured by substance bonding in the first and second joining regions to the first and second suspension arm elements;
wherein the first joining region and the second joining region are arranged offset to each other relative to the tube axis,
wherein the first joining region has a first axial extension parallel to the tube axis;
wherein the second joining region has a second axial extension parallel to the tube axis;
wherein a first joint center is defined centrally to the first axial extension and perpendicular to the tube axis;
wherein a second joint center is defined centrally to the second axial extension and perpendicular to the tube axis; and
wherein the first joint center is spaced from the second joint center by an offset.
2. The axle unit as claimed in claim 1, wherein the first suspension arm element and the second suspension arm element are configured as separate components.

3. The axle unit as claimed in claim 2, wherein the first joining region is arranged closer to the center of the axle tube than the second joining region.
4. The axle unit as claimed in claim 3, wherein the offset is 0.05 to 0.4 times an outer diameter of the axle tube in the region of the first and second suspension arm elements.
5. The axle unit as claimed in claim 4, wherein the offset is 0.07 to 0.2 times an outer diameter of the axle tube in the region of the first and second suspension arm elements.
6. The axle unit as claimed in claim 5, wherein the offset is 0.07 to 0.1 times an outer diameter of the axle tube in the region of the first and second suspension arm elements.
7. The axle unit as claimed in claim 4, wherein at least one of the first joining region and the second joining region has a peripheral face, wherein the peripheral face has a central length, and wherein a ratio of the central length to a circumference of the axle tube in the area of the first joining region and the second joining region is 0.4 to 1.3.
8. The axle unit as claimed in claim 7, wherein the ratio of the central length to the circumference of the axle tube is 0.6 to 1.
9. The axle unit as claimed in claim 8, wherein the ratio of the central length to the circumference of the axle tube is 0.85 to 0.95.
10. The axle unit as claimed in claim 7, wherein a length of the first axial extension is equal to a length of the second axial extension.
11. The axle unit as claimed in claim 10, wherein the axle tube has a pressure half and a tension half, wherein the first joining region is located in the pressure half and wherein the second joining region is located in the tension half.
12. The axle unit as claimed in claim 11, wherein the first suspension arm element and the second suspension arm element form an overlap at the ends of the first suspension arm element and the second suspension arm element opposite the pivot axis.
13. The axle unit as claimed in claim 12, wherein the first suspension arm element and the second suspension arm element form two overlaps, wherein the overlaps lie substantially opposite each other relative to the tube axis.
14. The axle unit as claimed in claim 13, wherein a carrier element is configured to be secured by form fit and force fit to at least one of the first suspension arm element and the second suspension arm element.
15. The axle unit as claimed in claim 1, wherein the first joining region is arranged closer to the center of the axle tube than the second joining region.
16. The axle unit as claimed in claim 1, wherein the offset is 0.05 to 0.4 times an outer diameter of the axle tube in the region of the first and second suspension arm elements.
17. The axle unit as claimed in claim 16, wherein the offset is 0.07 to 0.2 times an outer diameter of the axle tube in the region of the first and second suspension arm elements.
18. The axle unit as claimed in claim 17, wherein the offset is 0.07 to 0.1 times an outer diameter of the axle tube in the region of the first and second suspension arm elements.
19. The axle unit as claimed in claim 16, wherein a length of the first axial extension is equal to a length of the second axial extension.
20. The axle unit as claimed in claim 1, wherein at least one of the first joining region and the second joining region has a peripheral face, wherein the peripheral face has a central length, and wherein a ratio of the central length to a circumference of the axle tube in the area of the first joining region and the second joining region is 0.4 to 1.3.

21. The axle unit as claimed in claim 20, wherein the ratio of the central length to the circumference of the axle tube is 0.6 to 1.

22. The axle unit as claimed in claim 21, wherein the ratio of the central length to the circumference of the axle tube is 0.85 to 0.95.

23. The axle unit as claimed in claim 1, wherein the axle tube has a pressure half and a tension half, wherein the first joining region is located in the pressure half and wherein the second joining region is located in the tension half.

24. The axle unit as claimed in claim 1, wherein the first suspension arm element and the second suspension arm element form an overlap at the ends of the first suspension arm element and the second suspension arm element opposite the pivot axis.

25. The axle unit as claimed in claim 1, wherein the first suspension arm element and the second suspension arm element form two overlaps, wherein the overlaps lie substantially opposite each other relative to the tube axis.

26. The axle unit as claimed in claim 1, wherein a carrier element is configured to be secured by form fit and force fit to at least one of the first suspension arm element and the second suspension arm element.

* * * * *